US011188467B2

(12) United States Patent
Diamand et al.

(10) Patent No.: US 11,188,467 B2
(45) Date of Patent: Nov. 30, 2021

(54) MULTI-LEVEL SYSTEM MEMORY WITH NEAR MEMORY CAPABLE OF STORING COMPRESSED CACHE LINES

(71) Applicant: Intel Corporation, Santa Clara, CA (US)

(72) Inventors: Israel Diamand, Aderet (IL); Alaa R. Alameldeen, Hillsboro, OR (US); Sreenivas Subramoney, Bellandur Post (IN); Supratik Majumder, Karnataka (IN); Srinivas Santosh Kumar Madugula, Andhra Pradesh (IN); Jayesh Gaur, Bangalore (IN); Zvika Greenfield, Kfar Sava (IL); Anant V. Nori, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 15/717,939

(22) Filed: Sep. 28, 2017

(65) Prior Publication Data

US 2019/0095331 A1   Mar. 28, 2019

(51) Int. Cl.
*G06F 12/00* (2006.01)
*G06F 12/0846* (2016.01)
(Continued)

(52) U.S. Cl.
CPC ...... *G06F 12/0848* (2013.01); *G06F 12/0811* (2013.01); *G06F 12/0886* (2013.01);
(Continued)

(58) Field of Classification Search
CPC ............. G06F 12/0848; G06F 12/0811; G06F 12/0886; G06F 12/121; G06F 12/128
See application file for complete search history.

(56) References Cited

U.S. PATENT DOCUMENTS

| | | |
|---|---|---|
| 5,912,839 A | 6/1999 | Ovshinsky et al. |
| 6,035,432 A | 3/2000 | Jeddeloh |
| | (Continued) | |

FOREIGN PATENT DOCUMENTS

| | | |
|---|---|---|
| CN | 1100540 A | 3/1995 |
| CN | 101079003 A | 11/2007 |
| | (Continued) | |

OTHER PUBLICATIONS

"Phase change memory-based 'moneta' system points to the future of computer storage", ScienceBlog, Jun. 2, 2011, 7 pgs.
(Continued)

*Primary Examiner* — Gurtej Bansal
(74) *Attorney, Agent, or Firm* — Compass IP Law PC

(57) ABSTRACT

A method is described. The method includes receiving a read or write request for a cache line. The method includes directing the request to a set of logical super lines based on the cache line's system memory address. The method includes associating the request with a cache line of the set of logical super lines. The method includes, if the request is a write request: compressing the cache line to form a compressed cache line, breaking the cache line down into smaller data units and storing the smaller data units into a memory side cache. The method includes, if the request is a read request: reading smaller data units of the compressed cache line from the memory side cache and decompressing the cache line.

12 Claims, 14 Drawing Sheets

Figure 1:
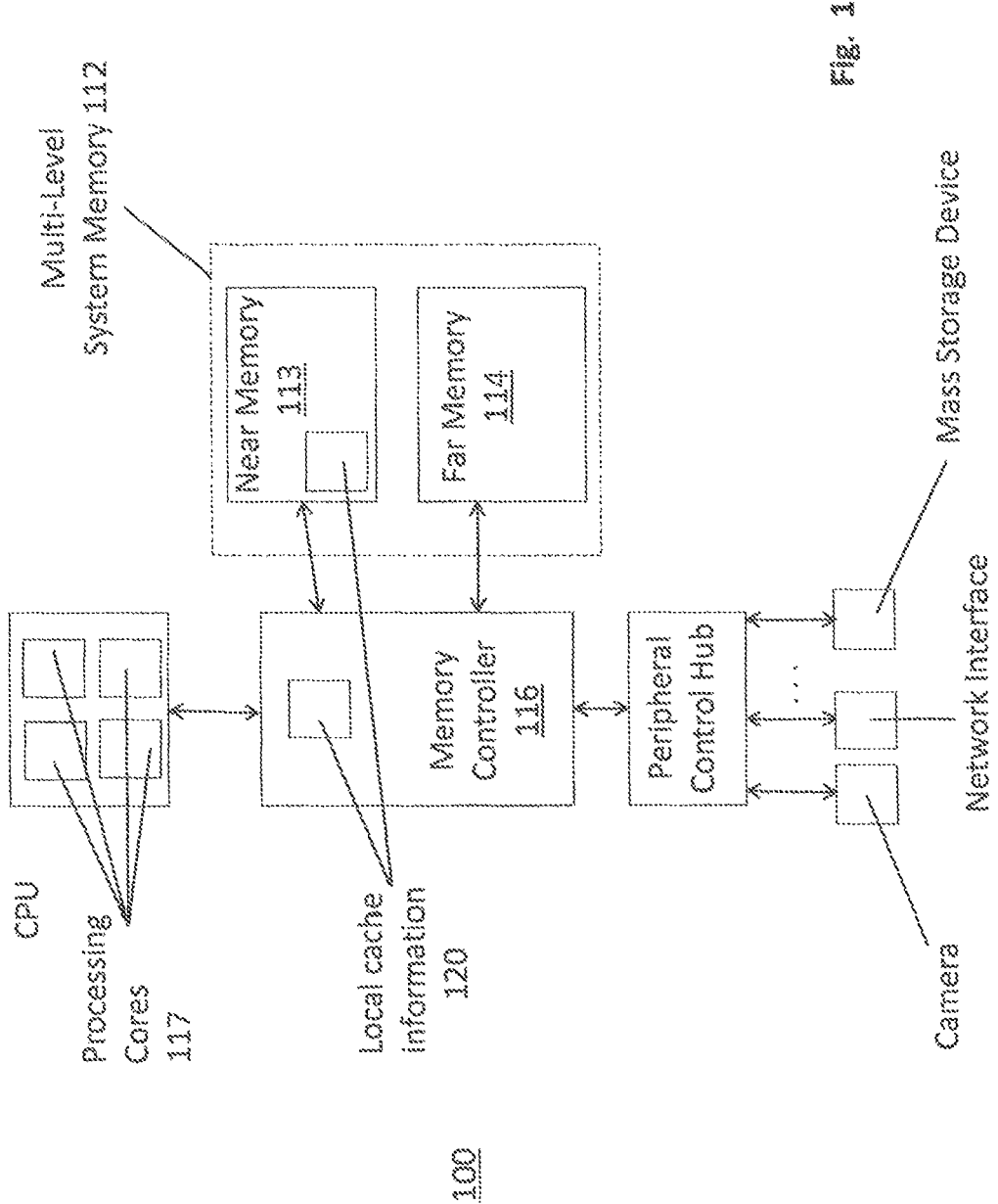

(51) Int. Cl.
*G06F 12/0811* (2016.01)
*G06F 12/128* (2016.01)
*G06F 12/121* (2016.01)
*G06F 12/0886* (2016.01)
*G06F 12/08* (2016.01)

(52) U.S. Cl.
CPC .......... *G06F 12/121* (2013.01); *G06F 12/128* (2013.01); *G06F 12/08* (2013.01); *G06F 2212/1016* (2013.01); *G06F 2212/282* (2013.01); *G06F 2212/283* (2013.01); *G06F 2212/401* (2013.01); *G06F 2212/621* (2013.01)

(56) References Cited

U.S. PATENT DOCUMENTS

| | | |
|---|---|---|
| 6,292,874 B1 | 9/2001 | Barnett |
| 7,590,918 B2 | 9/2009 | Parkinson |
| 7,600,078 B1 | 10/2009 | Cen et al. |
| 7,756,053 B2 | 7/2010 | Thomas et al. |
| 7,774,556 B2 | 8/2010 | Karamcheti et al. |
| 7,913,147 B2 | 3/2011 | Swaminathan et al. |
| 8,051,253 B2 | 11/2011 | Okin et al. |
| 8,462,537 B2 | 6/2013 | Karpov et al. |
| 8,462,577 B2 | 6/2013 | Zeng et al. |
| 8,463,948 B1 | 6/2013 | Qawami et al. |
| 8,605,531 B2 | 12/2013 | Kau |
| 8,607,089 B2 | 12/2013 | Qawami et al. |
| 8,612,676 B2 | 12/2013 | Dahlen et al. |
| 8,612,809 B2 | 12/2013 | Casper et al. |
| 8,626,997 B2 | 1/2014 | Qawami et al. |
| 8,649,212 B2 | 2/2014 | Kau et al. |
| 8,838,935 B2 | 9/2014 | Hinton et al. |
| 9,087,584 B2 | 7/2015 | Dahlen et al. |
| 9,262,318 B1 | 2/2016 | Vadlamani et al. |
| 9,317,429 B2 | 4/2016 | Ramanujan et al. |
| 9,342,453 B2 | 5/2016 | Nale et al. |
| 9,378,133 B2 | 6/2016 | Nachimuthu et al. |
| 9,378,142 B2 | 6/2016 | Ramanujan et al. |
| 9,430,372 B2 | 8/2016 | Nachimuthu et al. |
| 9,529,708 B2 | 12/2016 | Puthiyedath et al. |
| 9,600,407 B2 | 3/2017 | Faber |
| 9,600,416 B2 | 3/2017 | Ramanujan et al. |
| 9,619,408 B2 | 4/2017 | Nale et al. |
| 9,690,493 B2 | 6/2017 | Dahlen et al. |
| 2005/0273584 A1 | 12/2005 | Wisecup et al. |
| 2006/0047916 A1 | 3/2006 | Ying et al. |
| 2007/0005922 A1 | 1/2007 | Swaminathan et al. |
| 2007/0255891 A1 | 11/2007 | Chow et al. |
| 2008/0016269 A1 | 1/2008 | Chow et al. |
| 2008/0034148 A1 | 2/2008 | Gower et al. |
| 2008/0082766 A1 | 4/2008 | Okin et al. |
| 2008/0235443 A1 | 9/2008 | Chow et al. |
| 2008/0270811 A1 | 10/2008 | Chow et al. |
| 2009/0119498 A1 | 5/2009 | Narayanan |
| 2009/0313416 A1 | 12/2009 | Nation |
| 2010/0110748 A1 | 5/2010 | Best |
| 2010/0131827 A1 | 5/2010 | Sokolov et al. |
| 2010/0291867 A1 | 11/2010 | Abdulla et al. |
| 2010/0293317 A1 | 11/2010 | Confalonier et al. |
| 2010/0306446 A1 | 12/2010 | Villa et al. |
| 2010/0306453 A1 | 12/2010 | Doller |
| 2010/0318718 A1 | 12/2010 | Eilert et al. |
| 2011/0047365 A1 | 2/2011 | Hentosh et al. |
| 2011/0060869 A1 | 3/2011 | Schuette |
| 2011/0153916 A1 | 6/2011 | Chinnaswamy et al. |
| 2011/0208900 A1 | 8/2011 | Schuette et al. |
| 2011/0291884 A1 | 12/2011 | Oh et al. |
| 2013/0268741 A1 | 10/2013 | Daly et al. |
| 2013/0275661 A1 | 10/2013 | Zimmer et al. |
| 2013/0282967 A1 | 10/2013 | Ramanujan |
| 2013/0290597 A1 | 10/2013 | Faber |
| 2014/0129767 A1 | 5/2014 | Ramanujan et al. |
| 2014/0156935 A1 | 6/2014 | Raikin et al. |
| 2014/0201452 A1 | 7/2014 | Meredith |
| 2014/0297938 A1 | 10/2014 | Puthiyedath et al. |
| 2014/0351229 A1* | 11/2014 | Gupta ................. H03M 7/6088 |
| | | 707/693 |
| 2015/0006805 A1 | 1/2015 | Feekes et al. |
| 2015/0106676 A1 | 4/2015 | Greenfield et al. |
| 2015/0106677 A1 | 4/2015 | Greenfield et al. |
| 2016/0283389 A1 | 9/2016 | Diamand et al. |
| 2016/0283392 A1 | 9/2016 | Greenfield et al. |
| 2017/0031821 A1 | 2/2017 | Ramanujan et al. |
| 2017/0083443 A1 | 3/2017 | Wang et al. |
| 2017/0091093 A1 | 3/2017 | Wang et al. |
| 2017/0091099 A1 | 3/2017 | Greenfield et al. |
| 2017/0139649 A1 | 5/2017 | Puthiyedath et al. |
| 2017/0249250 A1 | 8/2017 | Ramanujan et al. |
| 2017/0249266 A1 | 8/2017 | Nale et al. |
| 2017/0277633 A1 | 9/2017 | Wilkerson et al. |
| 2017/0286210 A1 | 10/2017 | Yigzaw et al. |
| 2017/0286298 A1 | 10/2017 | Geetha et al. |
| 2017/0371793 A1* | 12/2017 | Saidi .................. G06F 12/0868 |
| 2017/0371795 A1 | 12/2017 | Wang et al. |
| 2018/0088822 A1 | 3/2018 | Alameldeen et al. |
| 2018/0088853 A1 | 3/2018 | Kotra et al. |
| 2018/0089096 A1 | 3/2018 | Greenspan et al. |
| 2018/0095674 A1 | 4/2018 | Alameldeen et al. |
| 2018/0189192 A1 | 7/2018 | Diamand et al. |
| 2019/0006340 A1 | 1/2019 | Ganguly et al. |

FOREIGN PATENT DOCUMENTS

| | | |
|---|---|---|
| CN | 101620539 B | 12/2013 |
| WO | 2005002060 A2 | 1/2005 |

OTHER PUBLICATIONS

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array," https://www.flashmemorysummit.com/English/Collaterals/Proceedings/2011/Pr- oceedings.sub.--Chrono.sub.--2011.html, Flash Memory Summit 2011 Proceedings, Aug. 11, 2011.

Bailey et al. , "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/0 Through Byte-Addressable, Persistent Memory", SOSP '09, Oct. 11, 2009, pp. 133-146. Big Sky, Montana, USA.

Dhiman, et al. "PDRAM: A Hybrid PRAM and DRAM Main Memory System", Jul. 26, 2009, Department of Computer Science and Engineering, 6 pages.

Freitas et al., "Storage-class memory: The next storage system technology", IBM J. Res. & Dev., Jul./Sep. 2008, pp. 439-447, vol. 52, No. 4/5.

Jacob, "The Memory System You Can't Avoid It, You Can't Ignore It, You Can't Fake It," Morgan & Claypool, Synthesis Lectures on Computer Architecture, vol. 4, No. 1, pp. 1-77, Jun. 2009.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09 Proceedings of the 36th Annual International Symposium on Computer Architecture, pp. 2-13, Jun. 20-24, 2009.

(56) References Cited

OTHER PUBLICATIONS

Mearian, "IBM announces computer memory breakthrough Phase-change memory offers 100 times the write performance of NANO flash", Jun. 30, 2011, 3 pgs.
Mogul et al., "Operating System Support for NVM+DRAM Hybrid Main Memory", 12th Workshop on Hot Topics in Operating Systems {HatOS XII), May 18, 2009, 9 pgs.
Quereshi et al., "Scalable High Performance Main Memory System Using Phase-Change Memory Technology", ISCA '09, Jun. 20, 2009, 10 pgs., Austin, Texas, USA.
Raoux et al., "Phase-Change Random Access Memory: A Scalable Technology," IBM Journal of Research and Development, vol. 52, Issue 4, pp. 465-479, Jul. 2008.
Nu et al., "eNVy: A Non-Volatile, Main Memory Storage System," ASPLOS VI Proceedings of the Sixth International Conference on Architectural Support for Programming Languages and Operating Systems, 12 pages, Oct. 1994.
Office Action for U.S. Appl. No. 17/092,093, dated Dec. 28, 2020 ,8 pages.

* cited by examiner

Fig. 4C

421 — Uncompressed Line, 6 Blocks

| | Block Type | Byte10 | Byte9 | Byte8 | Byte7 | Byte6 | Byte5 | Byte4 | Byte3 | Byte2 | Byte1 | Byte0 |
|---|---|---|---|---|---|---|---|---|---|---|---|---|
| 0 | Header | line type | ECC[10:0] | | | | | | | | | |
| 1-5 | Data | Up to 11 bytes data | | | | | | | | | Up to 9 bytes data | |

422 — FP, 1-5 Blocks

| | Block Type | Byte10 | Byte9 | Byte8 | Byte7 | Byte6 | Byte5 | Byte4 | Byte3 | Byte2 | Byte1 | Byte0 |
|---|---|---|---|---|---|---|---|---|---|---|---|---|
| 0 | Header | uncompressed | ECC[10:0] | | | | | | | | | |
| 1-4 | Data | 11 uncompressed data bytes | | | | | | | | | 9 uncompressed data bytes | |

424

423 — BDI, 2-4 Blocks

| | Block Type | Byte10 | Byte9 | Byte8 | Byte7 | Byte6 | Byte5 | Byte4 | Byte3 | Byte2 | Byte1 | Byte0 |
|---|---|---|---|---|---|---|---|---|---|---|---|---|
| 0 | Header | FP | ECC[10:0] | | | | | | | | | |
| 1-3 | Data | 11 compressed data bytes | | | | | | | | | 9 compressed data bytes | |

425

| | Block Type | Byte10 | Byte9 | Byte8 | Byte7 | Byte6 | Byte5 | Byte4 | Byte3 | Byte2 | Byte1 | Byte0 |
|---|---|---|---|---|---|---|---|---|---|---|---|---|
| 0 | Header | BDI | ECC[10:0] | | | | | | | | | |
| 1-3 | Data | 11 compressed data bytes | | | | | | | | | 9 compressed data bytes | |

MULTI-LEVEL SYSTEM MEMORY WITH NEAR MEMORY CAPABLE OF STORING COMPRESSED CACHE LINES

FIELD OF INVENTION

The field of invention pertains generally to the computing sciences, and, more specifically, to a multi-level system memory with near memory capable of storing compressed cache lines.

BACKGROUND

A pertinent issue in many computer systems is the system memory (also referred to as "main memory"). Here, as is understood in the art, a computing system operates by executing program code stored in system memory and reading/writing data that the program code operates on from/to system memory. As such, system memory is heavily utilized with many program code and data reads as well as many data writes over the course of the computing system's operation. Finding ways to improve system memory accessing performance is therefore a motivation of computing system engineers.

FIGURES

Figure 3:
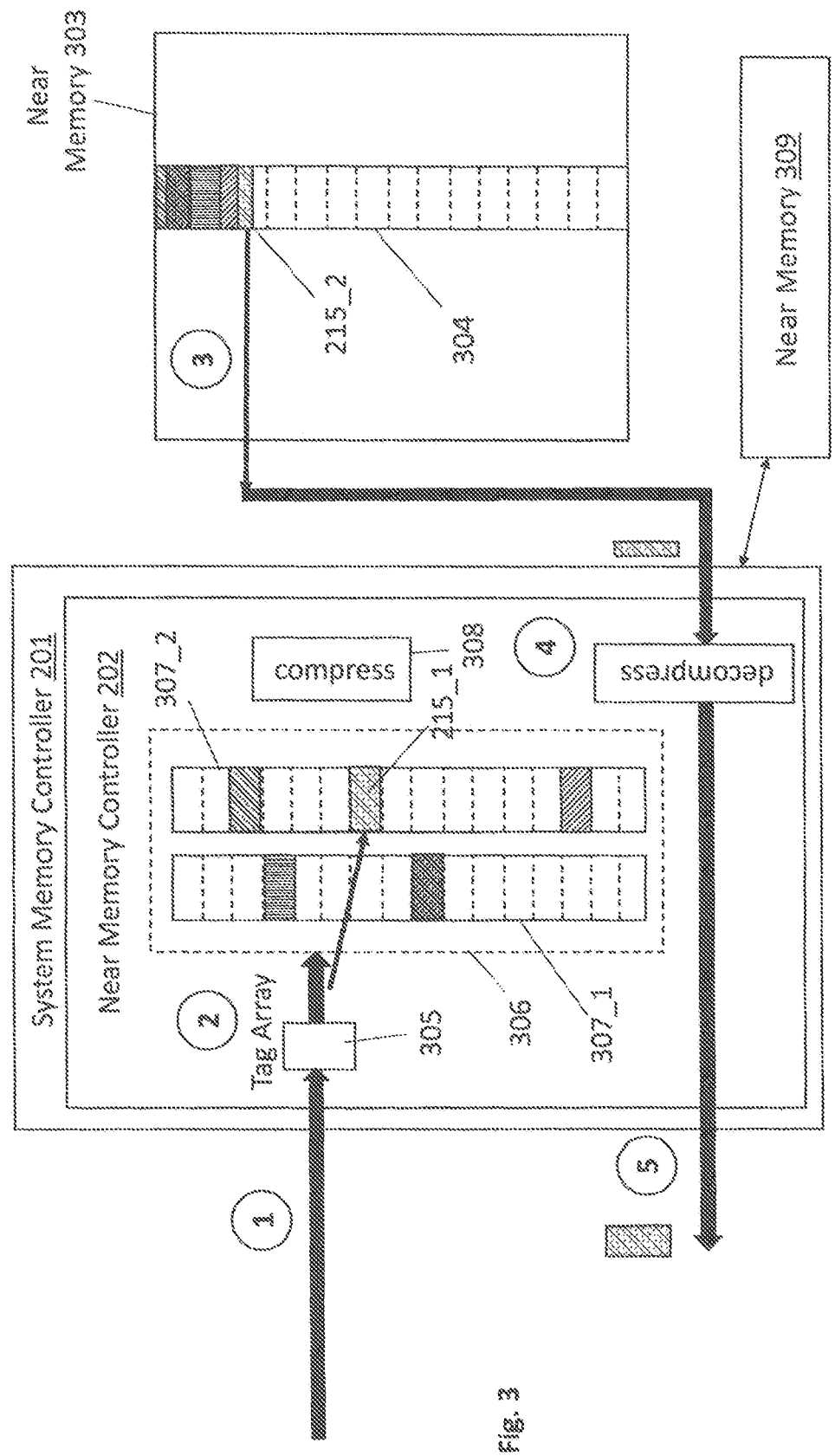
Figure 5:
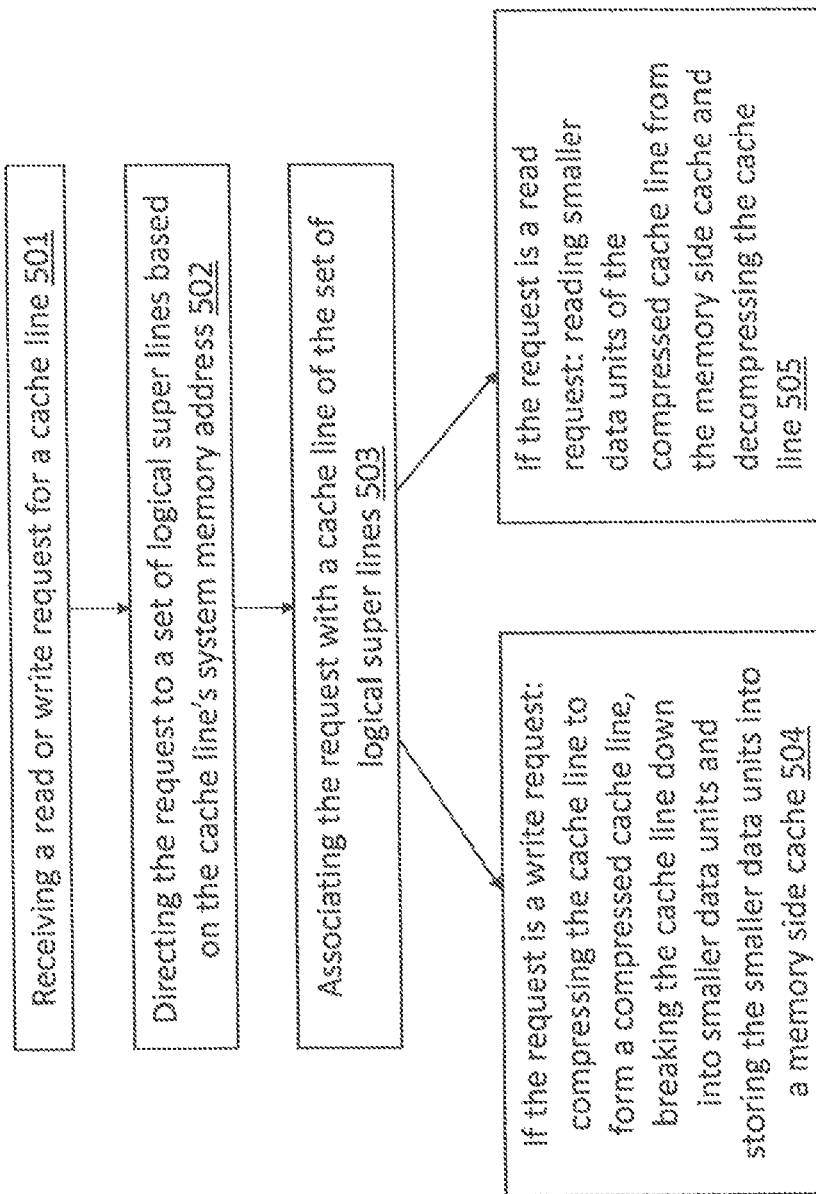
Figure 6:
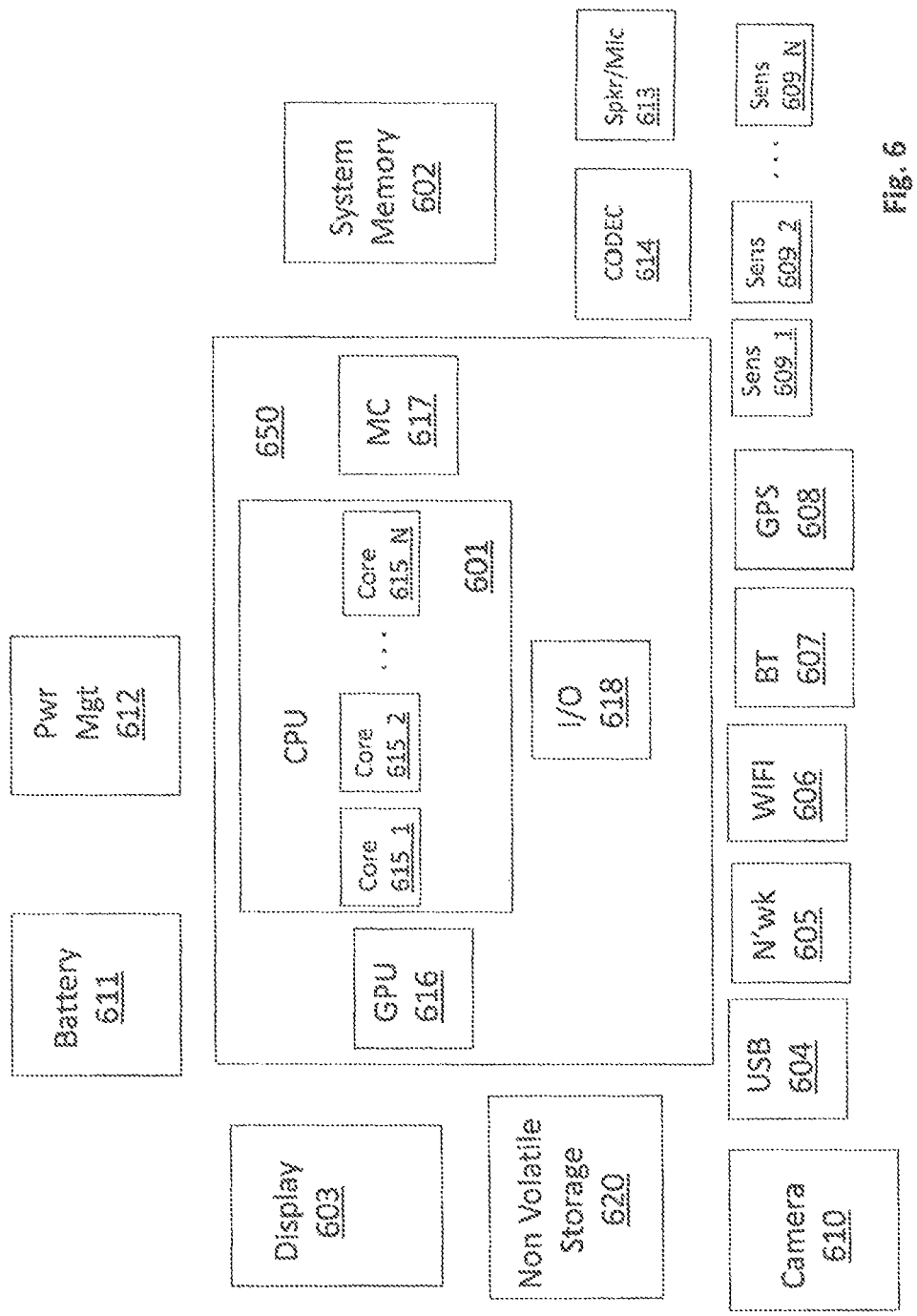

A better understanding of the present invention can be obtained from the following detailed description in conjunction with the following drawings, in which:

FIG. 1 shows a computing system with a multi-level system memory;

FIGS. 2a, 2b, 2c, 2d, 2e and 2f pertain to write behavior of an improved multi-level system memory subsystem;

FIG. 3 pertains to write behavior of an improved multi-level system memory subsystem;

FIGS. 4a, 4b, 4c and 4d pertain to hardware embodiments for both a memory controller and near memory of an improved multi-level system memory subsystem;

FIG. 5 pertains to a methodology of an improved multi-level system memory subsystem;

FIG. 6 shows a computing system.

DETAILED DESCRIPTION

1.0 Multi-Level System Memory

Recall from the Background discussion that system designers seek to improve system memory performance. One of the ways to improve system memory performance is to have a multi-level system memory. FIG. 1 shows an embodiment of a computing system 100 having a multi-tiered or multi-level system memory 112. According to various embodiments, a smaller, faster near memory 113 may be utilized as a cache for a larger, slower far memory 114.

In the case where near memory 113 is used as a cache, near memory 113 is used to store an additional copy of those data items in far memory 114 that are expected to be more frequently used by the computing system. By storing the more frequently used items in near memory 113, the system memory 112 will be observed as faster because the system will often read/write from/to items that are being stored in faster near memory 113. For an implementation using a write-back technique, the copy of data items in near memory 113 may contain data that has been updated by the CPU, and is thus more up-to-date than the data in far memory 114. The process of writing back 'dirty' cache entries to far memory 114 ensures that such changes are preserved in non-volatile far memory 114.

According to various embodiments, near memory cache 113 has lower access times and/or higher bandwidth than the lower tiered far memory 114 For example, the near memory 113 may exhibit reduced access times by having a faster clock speed than the far memory 114. Here, the near memory 113 may be a faster (e.g., lower access time), volatile system memory technology (e.g., high performance dynamic random access memory (DRAM) and/or SRAM memory cells) co-located with the memory controller 116. By contrast, far memory 114 may be either a volatile memory technology implemented with a slower clock speed (e.g., a DRAM component that receives a slower clock) or, e.g., a non-volatile memory technology that is slower (e.g., longer access time) than volatile/DRAM memory or whatever technology is used for near memory.

For example, far memory 114 may be comprised of an emerging non-volatile random access memory technology such as, to name a few possibilities, a phase change based memory, a three dimensional crosspoint memory, "write-in-place" non-volatile main memory devices, memory devices having storage cells composed of chalcogenide, multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc. Any of these technologies may be byte addressable so as to be implemented as a main/system memory in a computing system rather than traditional block or sector based non-volatile mass storage.

Emerging non-volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non-volatile memory technologies to be used in a main system memory role rather than a traditional mass storage role (which is the traditional architectural location of non-volatile storage).

Regardless of whether far memory 114 is composed of a volatile or non-volatile memory technology, in various embodiments far memory 114 acts as a true system memory in that it supports finer grained data accesses (e.g., cache lines) rather than only larger based "block" or "sector" accesses associated with traditional, non-volatile mass storage (e.g., solid state drive (SSD), hard disk drive (HDD)), and/or, otherwise acts as a byte addressable memory that the program code being executed by processor(s) of the CPU operate out of.

Because near memory 113 acts as a cache, near memory 113 may not have formal addressing space. Rather, in some cases, far memory 114 defines the individually addressable memory space of the computing system's main memory. In various embodiments near memory 113 acts as a cache for far memory 114 rather than acting a last level CPU cache. Generally, a CPU cache is optimized for servicing CPU transactions. By contrast, a memory side cache is designed to handle, e.g., all accesses directed to system memory, irrespective of whether they arrive from the CPU, from a Peripheral Control Hub, a display controller or some component other than the CPU.

In various embodiments, system memory may be implemented with dual in-line memory module (DIMM) cards where a single DIMM card has both volatile (e.g., DRAM) and (e.g., emerging) non-volatile memory semiconductor chips disposed on it. In an embodiment, the DRAM chips effectively act as an on board cache for the non-volatile memory chips on the DIMM card. Ideally, the more frequently accessed cache lines of any particular DIMM card will be accessed from that DIMM card's DRAM chips rather than its non-volatile memory chips. Given that multiple DIMM cards may be plugged into a working computing system and each DIMM card is only given a section of the system memory addresses made available to the processing cores 117 of the semiconductor chip that the DIMM cards are coupled to, the DRAM chips are acting as a cache for the non-volatile memory that they share a DIMM card with rather than as a last level CPU cache.

In other configurations DIMM cards having only DRAM chips may be plugged into a same system memory channel (e.g., a double data rate (DDR) channel) with DIMM cards having only non-volatile system memory chips. Ideally, the more frequently used cache lines of the channel are in the DRAM DIMM cards rather than the non-volatile memory DIMM cards. Thus, again, because there are typically multiple memory channels coupled to a same semiconductor chip having multiple processing cores, the DRAM chips are acting as a cache for the non-volatile memory chips that they share a same channel with rather than as a last level CPU cache.

In yet other possible configurations or implementations, a DRAM device on a DIMM card can act as a memory side cache for a non-volatile memory chip that resides on a different DIMM and is plugged into a same or different channel than the DIMM having the DRAM device. Although the DRAM device may potentially service the entire system memory address space, entries into the DRAM device are based in part from reads performed on the non-volatile memory devices and not just evictions from the last level CPU cache. As such the DRAM device can still be characterized as a memory side cache.

In another possible configuration, a memory device such as a DRAM device functioning as near memory 113 may be assembled together with the memory controller 116 and processing cores 117 onto a single semiconductor device (e.g., as embedded DRAM) or within a same semiconductor package (e.g., stacked on a system-on-chip that contains, e.g., the CPU, memory controller, peripheral control hub, etc.). Far memory 114 may be formed by other devices, such as slower DRAM or non-volatile memory and may be attached to, or integrated in the same package as well. Alternatively, far memory may be external to a package that contains the CPU cores and near memory devices. A far memory controller may also exist between the main memory controller and far memory devices. The far memory controller may be integrated within a same semiconductor chip package as CPU cores and a main memory controller, or, may be located outside such a package (e.g., by being integrated on a DIMM card having far memory devices).

In still other embodiments, at least some portion of near memory 113 has its own system address space apart from the system addresses that have been assigned to far memory 114 locations. In this case, the portion of near memory 113 that has been allocated its own system memory address space acts, e.g., as a higher priority level of system memory (because it is faster than far memory) rather than as a memory side cache. In other or combined embodiments, some portion of near memory 113 may also act as a last level CPU cache.

In various embodiments when at least a portion of near memory 113 acts as a memory side cache for far memory 114, the memory controller 116 and/or near memory 113 may include local cache information (hereafter referred to as "Metadata") 120 so that the memory controller 116 can determine whether a cache hit or cache miss has occurred in near memory 113 for any incoming memory request.

In the case of an incoming write request, if there is a cache hit, the memory controller 116 writes the data (e.g., a 64-byte CPU cache line or portion thereof) associated with the request directly over the cached version in near memory 113. Likewise, in the case of a cache miss, in an embodiment, the memory controller 116 also writes the data associated with the request into near memory 113 which may cause the eviction from near memory 113 of another cache line that was previously occupying the near memory 113 location where the new data is written to. However, if the evicted cache line is "dirty" (which means it contains the most recent or up-to-date data for its corresponding system memory address), the evicted cache line will be written back to far memory 114 to preserve its data content.

In the case of an incoming read request, if there is a cache hit, the memory controller 116 responds to the request by reading the version of the cache line from near memory 113 and providing it to the requestor. By contrast, if there is a cache miss, the memory controller 116 reads the requested cache line from far memory 114 and not only provides the cache line to the requestor (e.g., a CPU) but also writes another copy of the cache line into near memory 113.

In general, cache lines may be written to and/or read from near memory and/or far memory at different levels of granularity (e.g., writes and/or reads only occur at cache line granularity (and, e.g., byte addressability for writes/or reads is handled internally within the memory controller), byte granularity (e.g., true byte addressability in which the memory controller writes and/or reads only an identified one or more bytes within a cache line), or granularities in between.) Additionally, note that the size of the cache line maintained within near memory and/or far memory may be larger than the cache line size maintained by CPU level caches.

Different types of near memory caching implementation possibilities exist. Examples include direct mapped, set associative and fully associative. Depending on implementation, the ratio of near memory cache slots to far memory addresses that map to the near memory cache slots may be configurable or fixed.

Some systems may use super lines. Super lines are composed of multiple cache lines. For example, in the case of cache lines that are 64 bytes, a super line may be composed of 16, 32 or 64 different, usually adjacent, 64 byte cache lines. Super lines help reduce metadata overhead, since the cache line tag is associated with each super line instead of being associated with each smaller (e.g., 64B) cache line.

2.0 Compressed Near Memory Cache with Logical vs. Physical Cache Super Lines

FIGS. 2a through 2f show an efficient near memory caching approach in which the concept of a super line is retained logically, but physical accesses between the system memory controller 201 and near memory 203 remain at the cache line level or even at smaller increments of a cache line to achieve compression and low power consumption.

Figure 2A:
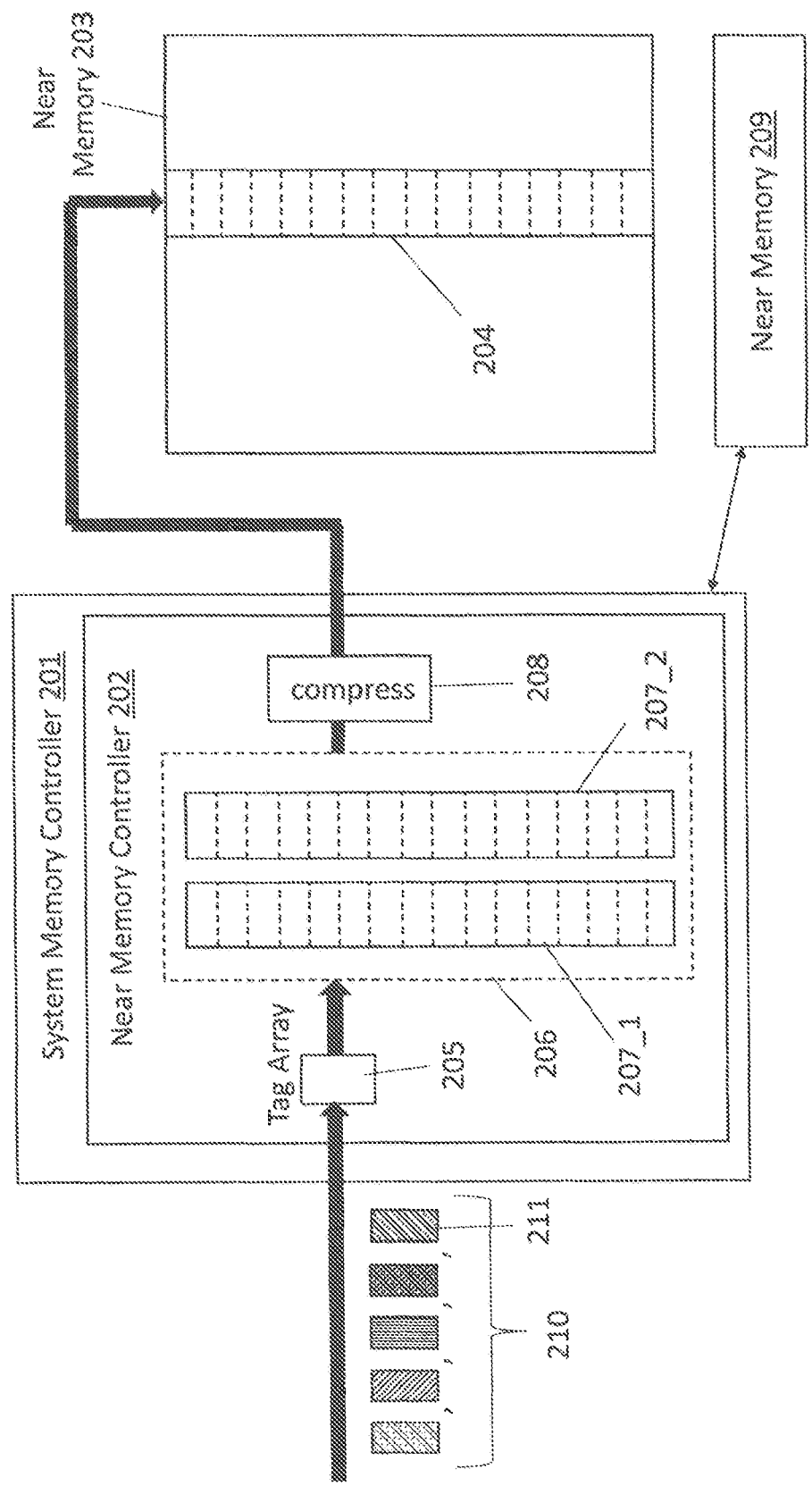

FIG. 2a shows a stream of write requests 210 for particular system memory cache lines. For ease of discussion, the example of FIG. 2a assumes that near memory 203 is empty so there is room in the near memory cache for each of the write requests.

Here, the near memory controller 202 keeps a tag array 205 (or similar information) that identifies a particular pair of "logical" super lines 206. As will be made clearer in the following discussion, the pair of super lines 206 are associated with a single, physical super line's worth of memory capacity 204 in near memory cache 203. Ideally, should write requests be received for every cache line slot of both logical super lines 206, they will be able to be compressed by compression logic 208 in the near memory controller 202 and stored in the single super line of cache space 204 in near memory 203.

That is, if on average every memory write request cache line that is associated with logical super line pair 206 can be compressed to half its size, two super lines worth of information can be cached into a single super line's worth of information 204 in near memory cache 203. It is pertinent to point out that the mapping of two logical super lines 206 into one super line of physical cache resources 204 is only exemplary and that other ratios of number of logical super lines to number of physical near memory super line space is possible (e.g., 3:1, 4:1, 3:2, 8:1, etc.).

Figure 2B:
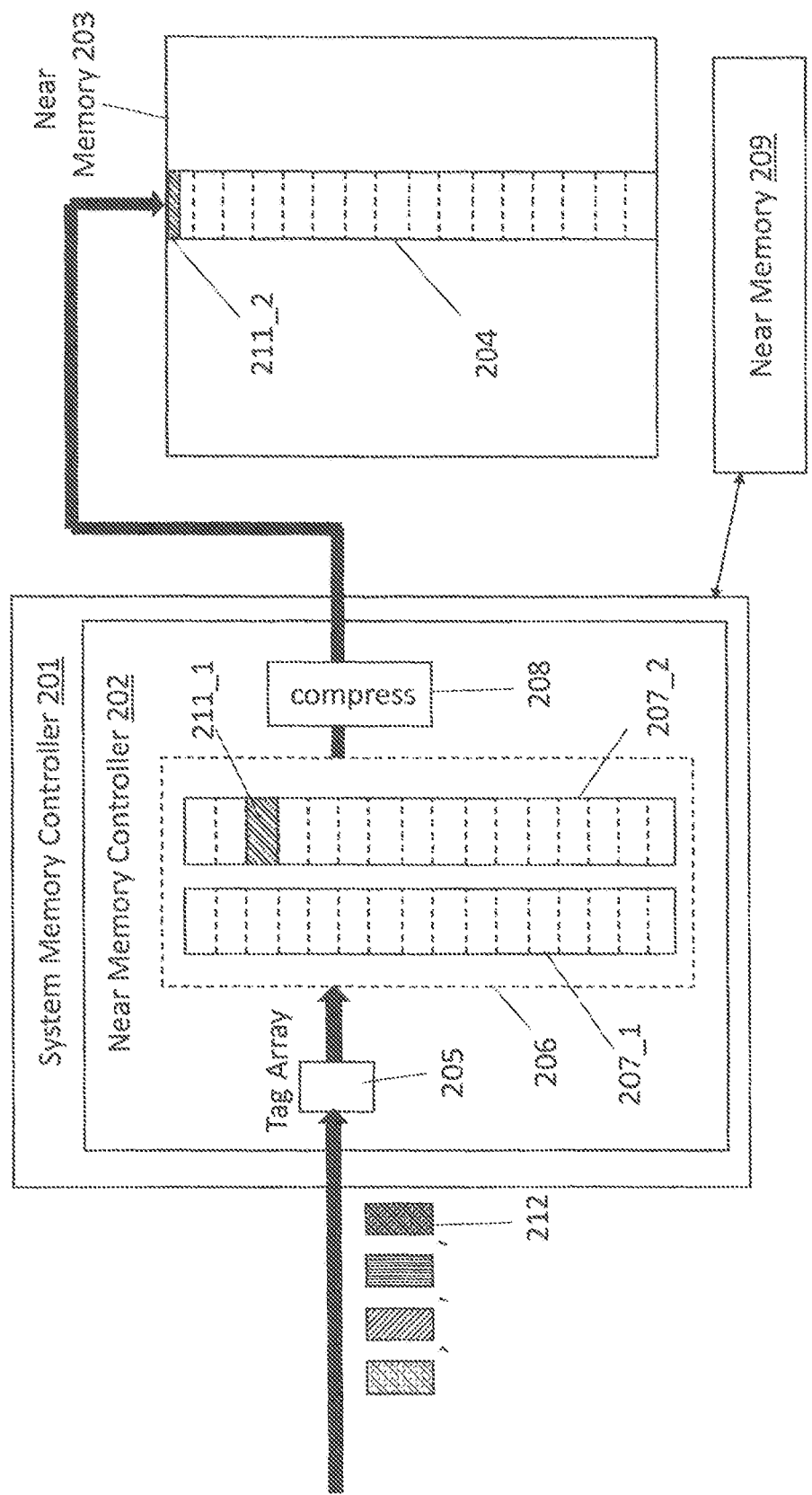

Referring to FIG. 2b, the write request for the first cache line 211 is processed. Here, the system memory address of the first cache line is mapped by the tag array 205 to the pair of logical super lines 206. Here, there are many pairs of logical super lines that map to a single super line in near memory cache, where, every pair of logical super lines is unique (map to a unique set of system memory cache line addresses) and map to a unique (different) super line in near memory cache. As such, there are many pairs of logical super lines that respectively map to many different physical super lines in near memory cache 203. For ease of illustration, FIG. 2b only shows one pair of logical super lines 206 and the particular physical super line's worth of cache resources 204 that the pair 206 maps to.

As such, continuing with a discussion of the write processing for the first cache line's write request 211, upon receipt of the write request 211, the tag array 205 performs a look-up on the cache line's system memory address to identify which pair of super lines that the cache line's address maps to. As can be seen in FIG. 2b, the address of the first cache line maps to logical super line pair 206.

Here, many different cache line system memory addresses (beyond two super lines worth) may map to a particular pair of logical super lines. As such, multiple cache lines within the system may compete for same near memory cache resources. Here, as just one example, system memory addresses of incoming cache line requests may be hashed by hashing logic of the tag array to identify which particular logical super line pair that the cache line maps to.

With the write request being directed to a particular logical super line pair 206, management logic circuitry associated with the pair (not shown in FIG. 2b for illustrative ease) determines which cache line location (slot) of the pair of logical super lines 206 that the incoming write request is to associated with. In various embodiments the management logic circuitry keeps a "free list" that identifies which cache line slots within the pair of super lines 206 are free (are not placeholding/consumed on behalf of a cache line that is presently stored in the physical super line 204 in near memory 203). In the present example, as discussed above, the near memory 203 is assumed to be empty as an initial condition. As such, the free list maintained by the management logic circuitry lists the entire storage capacity of both logical super lines 207_1, 207_2 of the pair 206 as being free.

Under more normal conditions, a number (perhaps all) of the cache line slots of the pair of logical super lines 206 are consumed (i.e., are placeholding for a cache line that is presently stored in the physical super line 204 in near memory 203). Under these circumstances, cache hit/miss logic circuitry that is a component of the management logic circuitry first determines if the system memory address of the write request is the same as one of the cache lines that is presently cached in near memory 203. Here, each cache line slot of the logical super line pair that is consumed/occupied includes meta-data that identifies the system memory address of the cache line that it is placeholding for. If the meta-data of an occupied slot includes the same system memory address as the incoming write request there is a cache hit (the cache line being targeted by the write request currently resides in the near memory super line 204).

If there is a cache hit, the write into the physical near memory super line 204 can proceed. Here, ideally, the new compressed cache line that results from the new write request is identical in size, or is at least smaller in size, than the older compressed version of the cache line that is residing in the physical super line 204 in near memory 203. If any of these conditions are true, the new compressed cache line can be written directly over the old compressed cache line. If the new compressed cache line is larger than the old compressed cache line, various approaches may be undertaken to handle the situation.

According to one approach, a portion of the new compressed cache line that is commensurate in size with the older compressed cache line is written directly over the old compressed cache line in near memory 203 and the remaining portion is written into free space (identified on the aforementioned free list) within the physical super line 204 resources in near memory cache 204.

If such free space does not exist, the compressed cache line will not fit into the physical super line 204 in its current state. As such, another compressed cache line (e.g., a consumed cache line slot within the logical super line pair 206 whose corresponding cache line has been least recently used (LRU) from the perspective of the pair's management logic) can be evicted from the physical super line 204 in near memory 204 to make room for the new compressed cache line. If this approach is taken, the evicted cache line is written to far memory 209. Besides LRU, other cache replacement policies to select the evicted line can be used (e.g., least frequently used (LFU), etc.).

Alternatively, because the new compressed cache line does not fit into the physical cache line 204 on its own, the management logic associated with logical super line pair 206 may choose not to cache the cache line associated with the write request and instead write the new updated cache line into far memory 209. In this case, the meta data kept in the cache line slot of the tag array that the cache line has mapped to is updated to reflect that the older version of the cache line that presently sits in near memory cache can be written over (the cache line is invalidated and free space has been created in the near memory).

In the present example, again, the near memory cache 203 is assumed to be empty. As such, the free list identifies all cache slots in the pair of logical super lines 206. The management logic picks one of these slots (as depicted in FIG. 2b, slot 211_1 is chosen). The near memory controller 202 then proceeds to compress and write the cache line into the near memory super line 204 cache resources.

The write process includes adding meta data for the slot 211_1 that the first cache line write request has been allocated to that: 1) identifies the system memory address of the first write request's cache line (e.g., its tag); 2) where the compressed cache line can be found in the physical super line's worth of near memory cache resources 204 and the size of the compressed cache line. The former is used for determining subsequent cache hit/miss results for later cache line requests that map to logical super line pair 206. The latter is used to fetch the compressed cache line or determine the current state of the physical super line of caching resources 204 in near memory 203. In various embodiments, described in more detail below, the information that identifies where the compressed cache line is kept in the near memory super line 204 identifies a "starting position" of the compressed cache line in the near memory super line 204 and a "length" or size of the compressed cache the extends from the starting position.

In the present example of FIG. 2b, again, the near memory super line 204 is empty. As such, the cache line 211_2 associated with the first write request is written at the "head" of the super line 204. Here, as will become more evident in the following discussion, any cache line having a placeholder in the pair of logical super lines 206 can be written into any physical location space of the near memory super line 204. Although cache line slots are demarcated in the near memory super line 204, in various embodiments, they are presented more as reference markers than a hard delimiter as to boundaries of stored cache lines (although other embodiments may choose to not cross such boundaries when writing a cache line into the physical super line 204).

As will be described in more detail below, in order to physically store compressed cache lines into the near memory super line 204, the compressed cache lines and the physical architecture of near memory 203 are broken down into smaller chunks or "blocks". For example, the amount of storage space for a single cache line in the physical near memory super line is broken down into six 11 byte blocks.

Likewise, a compressed cache line is composed of how many such 11 byte blocks are needed to keep all of the compressed cache line's information. For example, in the case of a nominal 64 byte cache line that is compressed to, e.g., 30 bytes of information, the cache line is broken down into three such 11 byte blocks. The three 11 byte blocks are then written into the near memory physical super line 204. As can be seen in FIG. 2b, the compressed cache line 211_2 associated with the first write request consumes approximately three such blocks as it consumes approximately one half of a cache line in the near memory super line 204.

Figure 2C:
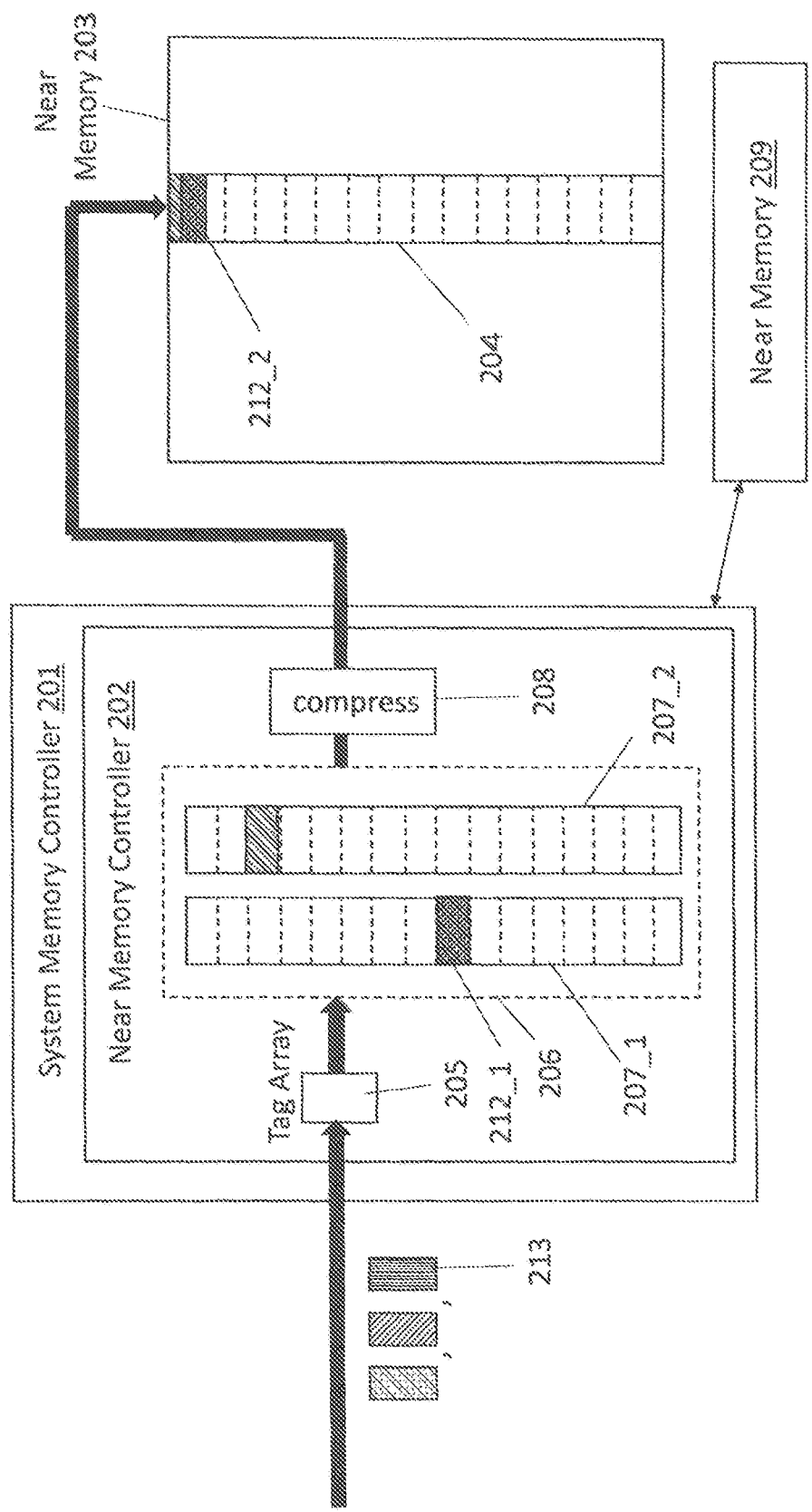

FIG. 2c shows the write process for the write request of the second cache line. The write process for the second cache line follows the same write process as the first cache line with the exception that, the first and second cache line's have different system memory addresses. As such, the management logic assigns the cache line associated with the second write request to a different cache line slot 212_1 within the logical super line pair 206. The second cache line is compressed and stored 212_2 in the near memory super line 204 at the tail of the first compressed cache line 211_2. The meta data of slot 212_1 is updated to reflect the system memory address of the second cache line, and its location and size in the near memory super line 204. As can be seen in FIG. 2c, the second compressed cache line 212_2 approximately consumes $\frac{5}{6}^{th}$ of a cache line's worth of resources in the near memory cache (e.g., five 11 byte blocks). As such, the first two compressed cache lines together 211_2, 212_2 only consume approximately ⅘ of a single cache line's worth of storage resources in the near memory super line 204.

Figure 2D:
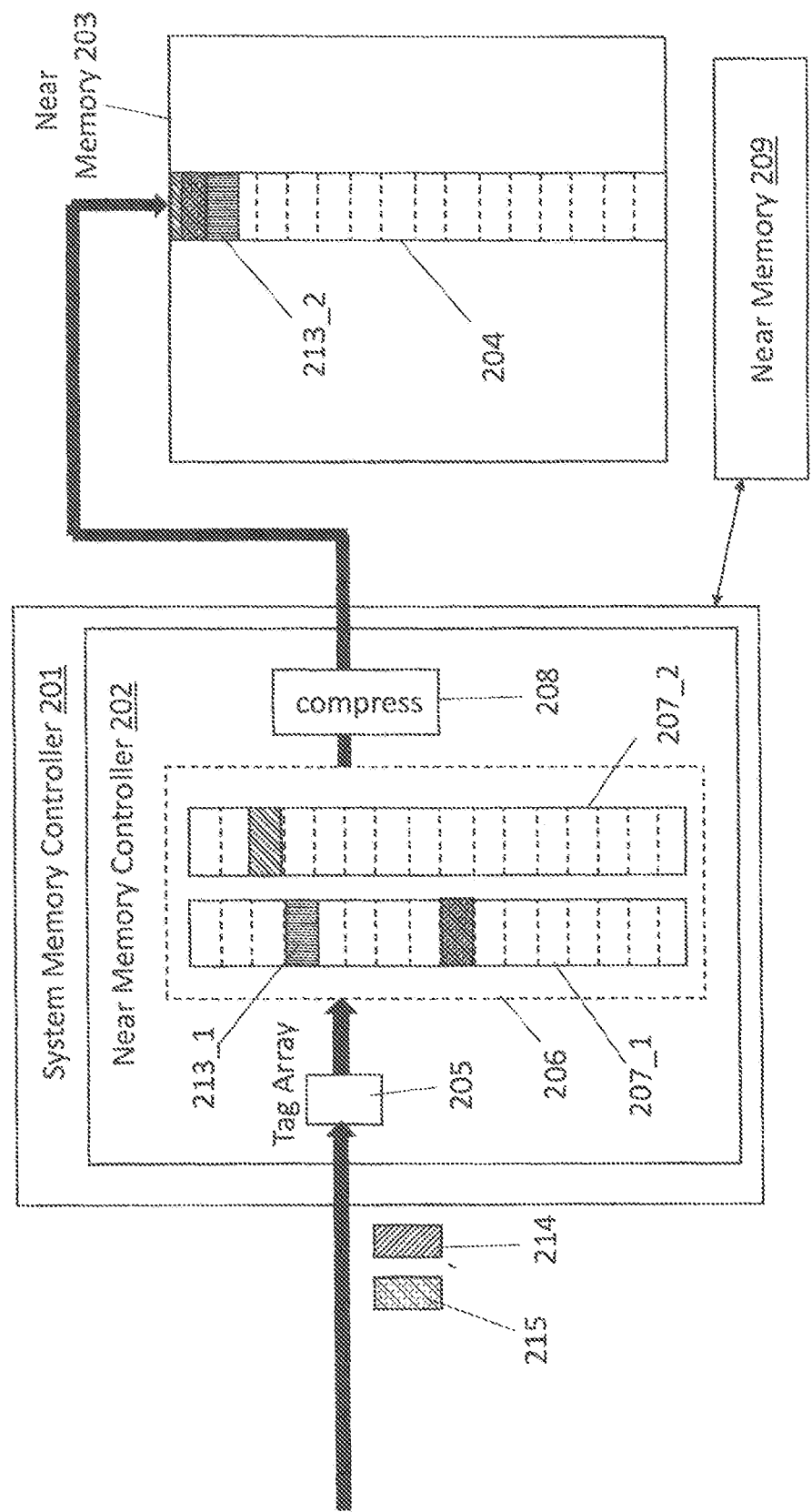

FIG. 2d shows the write process for the write request of the third cache line 213. Like the first two write requests 211, 212, a look-up is performed on the cache line's system memory address by the tag array logic circuitry 205 to see which pair of logical super lines the cache line's system memory address maps to. As observed in FIG. 2d, the third cache line 313 maps to logical super line pair 206. As with the other requests, the third cache line is assigned an unused slot 213_1 in the logical super line pair 206 and an attempt is made to compress the cache line and write it at the tail of the physical super line 204 near memory 203. However, unlike the first two cache lines 2111, 212, the third cache line 213 is not compressible. Here, some cache line data is (e.g., extremely randomized) such that compression algorithms are not able to significantly reduce the footprint size of the data.

As such, even though an attempt is made to compress the third cache line, its total size is not really reduced. In this case, the third cache line will split into six 11 byte blocks 213_2 which are written in succession at the tail of the second cache line 212_2 in the physical cache super line 204. As observed in FIG. 2d, the third cache line 213_2 approximately consumes an entire cache line's worth of space of the super line cache resources 204.

Here, in various embodiments, the near memory controller 202 includes logic circuitry 208 capable of performing different kinds of data compression to, e.g., use whichever of these will achieve the most compression for the cache line to be written into near memory. For example, in one embodiment, three different kinds of compression exist: 1) all zeros compression (in which no data is consumed in near memory at (since the data to be compressed is all zeros, a statement to that effect is marked in the meta data of the cache line slot that the cache line maps to in the appropriate logical super line); 2) Frequent pattern compression; 3) base-delta compression. For any cache line to be compressed, whichever of these three compression schemes that yields the most compression is the compression scheme that is applied to the cache line. Other compression algorithms can also be used like Huffman encoding, Limpel-Ziv (LZ) compression or any variation or combination of these algorithms.

Here, the metadata that is kept for a cache line in the logical super line placeholder slots may also include identification of which compression technique has been used. In an alternative or combined approach, this information is stored within one of the 11 byte blocks that are physically written into the near memory super line 204 so that it can be used by decompression logic that will decompress the cache line if/when it is read from the near memory super line 204.

Figure 2E:
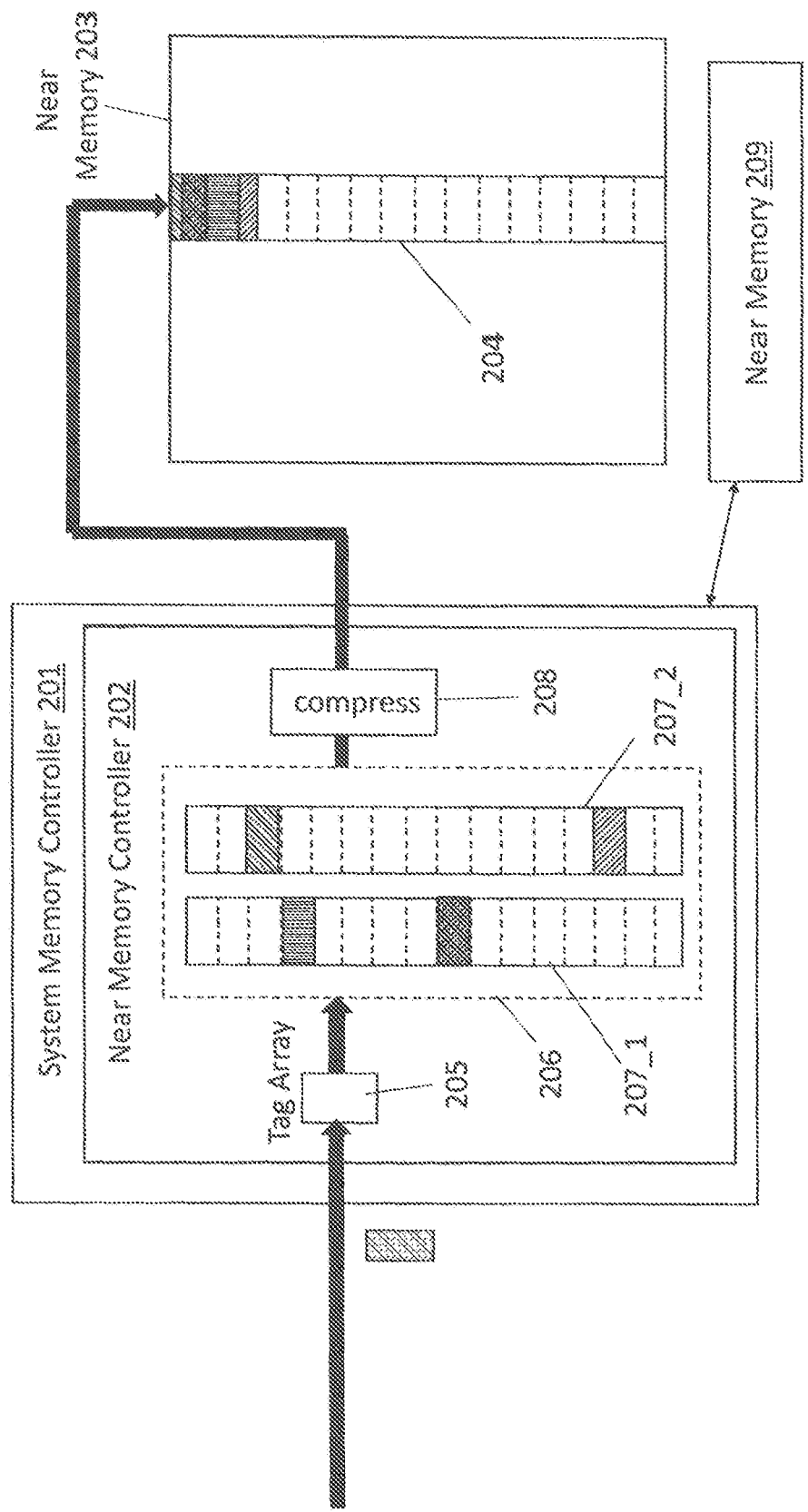
Figure 2F:
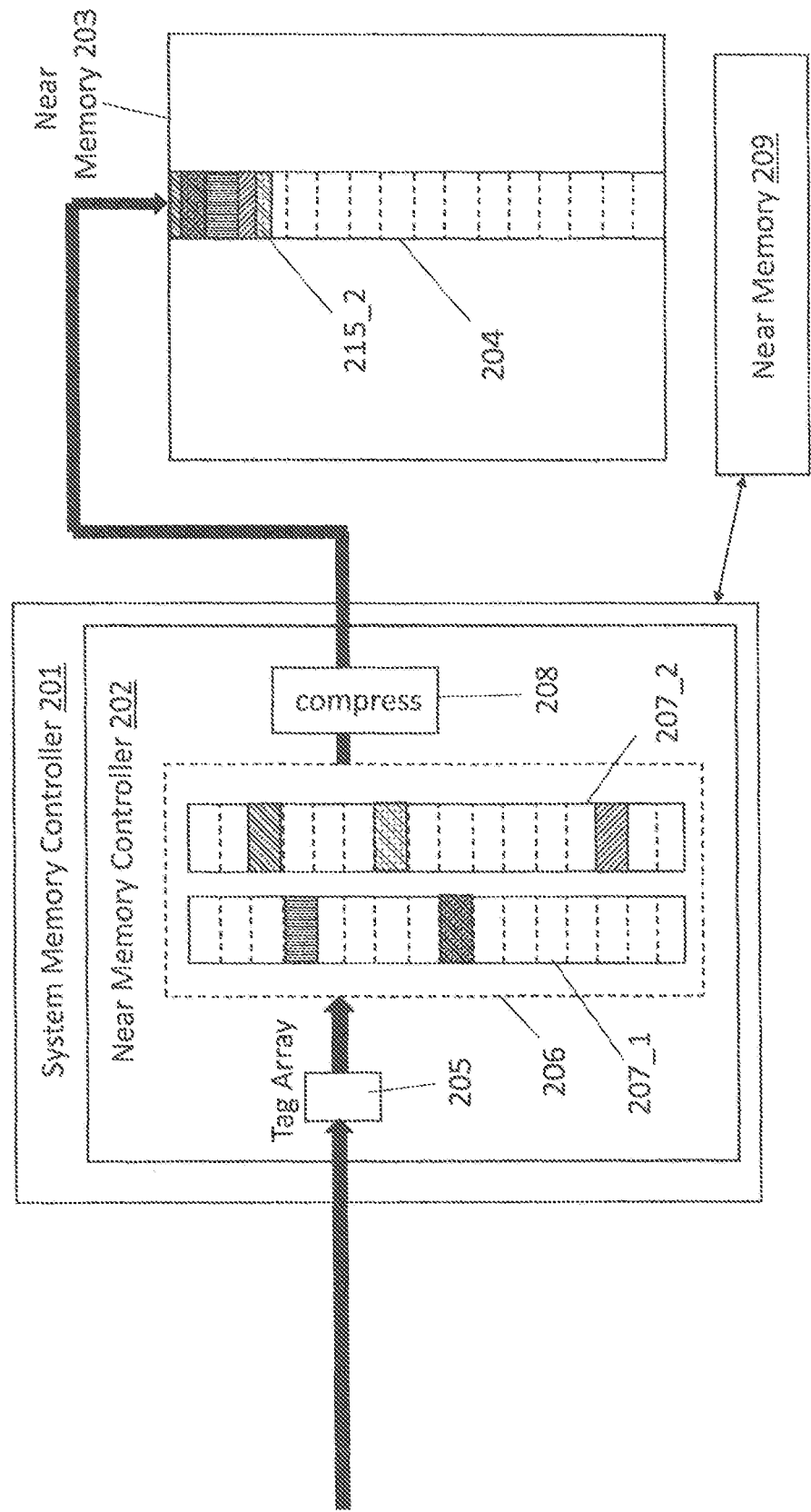

FIGS. 2e and 2f depict the processing of the write requests for the fourth and fifth cache lines 214, 215 respectively. As observed in FIG. 2f, when the fifth compressed cache 215_2 line is finally written into the near memory super line 204, all five cache lines have collectively been compressed down to an amount of information that only consumes about 2.5 cache line's worth of near memory super line resources.

FIG. 3 shows an embodiment of standard processing for a read request. Here, a read request is received 1 for the fifth cache line 215_2 (that was written during the processing of FIG. 2f). A look-up is performed on the read request's associated system memory address by the tag array logic circuitry 305 which directs the request to logical super line pair 206.

The management logic circuitry of the super line pair 206 then proceeds to analyze the meta data of its placeholders and detects a cache line hit with the meta data of slot 215_1. As discussed above, the meta data also contains information (e.g., starting position and length) that identifies where the physical cache line is kept in the near memory super line 204. The cache line 215_2 is then read 3 from the near memory super line 204. Here, recognizing that the fifth cache line 215_2 was compressed to about half a cache line's worth of information, the reading of the cache line 215_2 entails reading the three (or four) 11 byte blocks that were consumed in the near memory super line to store the fifth cache line 215_2. The read cache line is then decompressed 4 by decompression logic circuitry and forwarded 5 as the response to the initial read request.

FIGS. 4a through 4d show various depictions that illustrate an embodiment for the technology associated with breaking of a cache line down to 11 byte blocks so that storage of compressed cache lines can be effected.

Figure 4A:
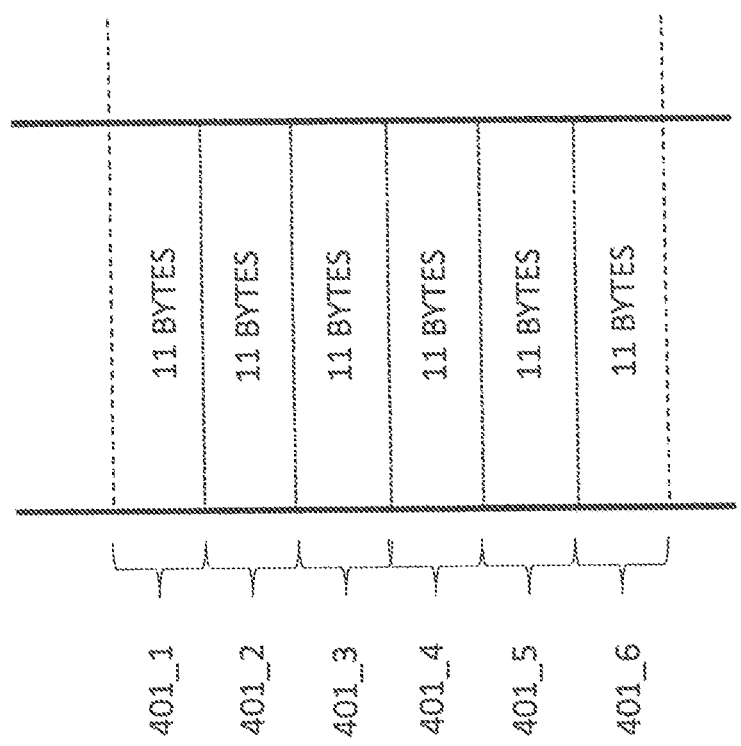

FIG. 4a depicts the basic structure of a cache line's worth of data stored in the physical near memory super line 204 of FIGS. 2a through 2f. As can be seen in FIG. 4a, a cache line's worth of data is stored as six 11 byte blocks 401_1 through 401_6. Here, assuming a nominal cache line is composed of 64 bytes, six 11 byte blocks corresponds to a total of 66 bytes.

Figure 4B:
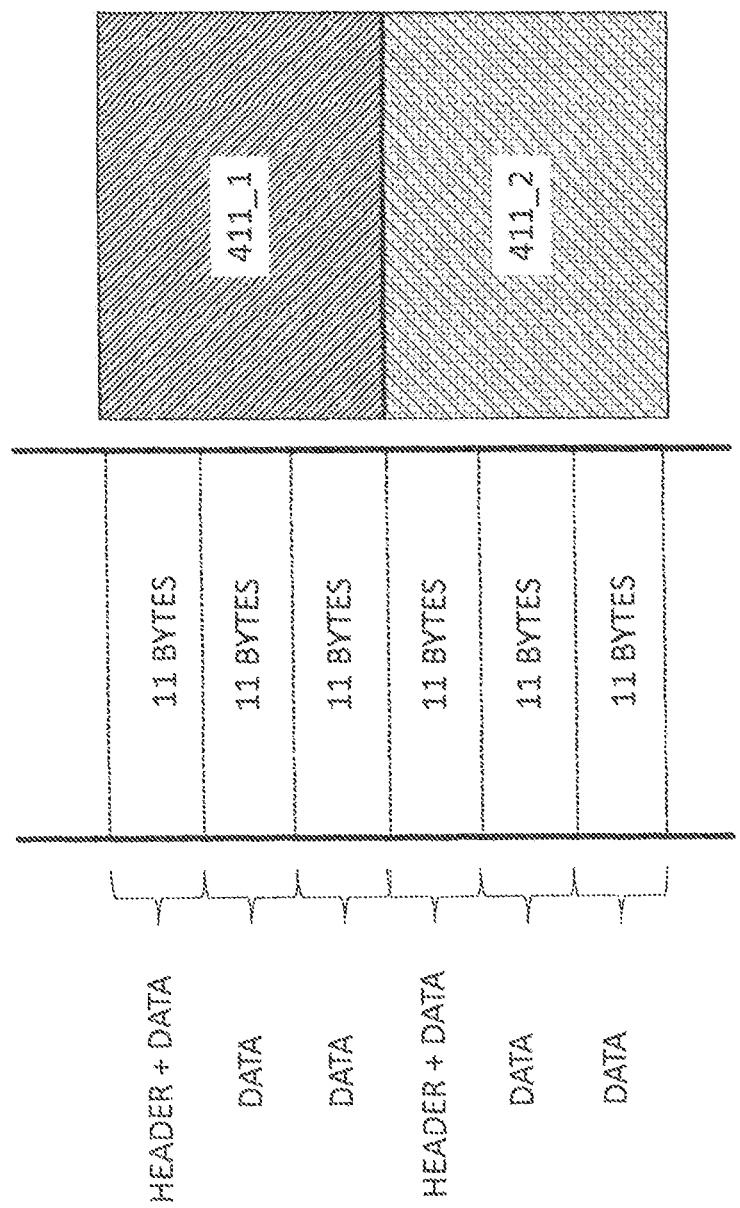

FIG. 4b shows two compressed cache lines being stored in a cache line's worth of data. As observed in FIG. 4b, in various embodiments, each cache line that is cached in the near memory super line includes a combination of "header" information (e.g., to indicate what type of compression has been applied to the cache line's data) and compressed data in the first 11 byte block and compressed data in the cache line's remaining 11 byte blocks. Here, FIG. 4b shows two cache lines 411_1, 411_2 that have been compressed by approximately 50% and therefor can be stored in the storage space of a single cache line's worth of data.

In the case of an uncompressed cache line, two bytes of header information plus 64 bytes of uncompressed cache line data corresponds to 66 bytes. Hence, an uncompressed cache line (akin to a worst case scenario) can "fit" into the six 11 byte blocks of FIG. 4a. As a cache line becomes more and more compressed, however, it will consumer fewer and fewer 11 byte blocks in order to be completely store all of its information. For example, a cache line that is approximately reduced by 75% (e.g., to 16 bytes of data) will only need two 11 byte blocks to have both its compressed customer data and its header information fully stored. Thus the breaking down of a cache line (and architecting near memory) into multiple 11 byte blocks allows for storage of the minimum number of such blocks per cache line in physical near memory. In this manner, the 11 byte block scheme provides for the physical realization of the compression (less near memory physical storage space is consumed as more data is able to be compressed).

FIG. 4c shows an embodiment of the structure of an 11 byte block for a system that supports three types of 11 byte blocks: 1) blocks for an uncompressed cache line 421; 2) blocks for a cache line that is compressed according to a frequent pattern compression scheme 422; 3) blocks for a cache line that is compressed according to a base-delta compression scheme 423. Recall that in a same system there may be another compression option in which the cache line data contains all zeros (or all 1s) and therefore the cache line's data can be stored in its corresponding meta data of the logical super line pair (no data is stored in near memory, just a note in the meta data that the cache line contains all 1s or all 0s).

As observed in FIG. 4c (and as alluded to above with respect to FIG. 4b), there are two types of blocks: 1) blocks that store header information and cache line data 424; and, 2) blocks that store only cache line data 425. Header blocks 424 are observed to include header information in bytes 10 and 9 and cache line data in bytes 8 through 0. The header information uses a portion of byte 10 to identify the type of compression applied ("uncompressed" for an uncompressed block, "FP" for a block whose cache line data is compressed according to a frequent pattern compression scheme and "BDI" for a block whose cache line data is compressed according to a "Base-Delta" compression scheme). The header information also uses the remaining portion of byte 10 and all of byte 9 for Error Correction Code (ECC) information. Blocks 425 that store only cache line data store cache line data in bytes 10 through 0.

Figure 4D:
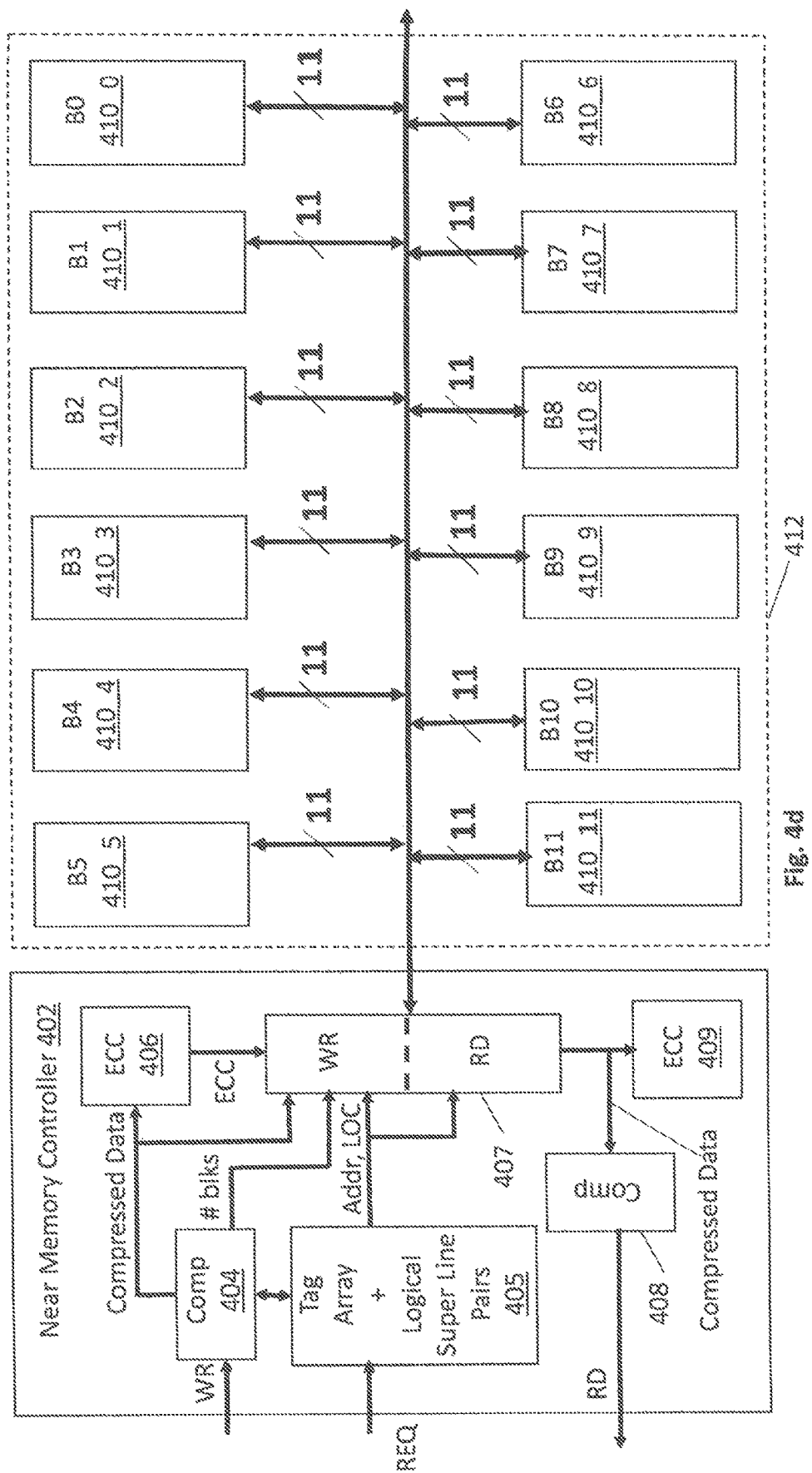

FIG. 4d shows an exemplary near memory controller 402 and near memory design 412 for implementing the near memory caching architecture described at length above. Here, in the case of a write operation, a write request is received into the tag array and logical super line pair logic circuitry. The tag array circuitry associates the request's system memory address with a particular set (pair) of logical super-lines. Management logic circuitry associated with the pointed to set/pair of logical super-lines performs a cache/hit miss operation and allocates a cache line slot location for the request if a cache miss occurs and space exists in the near memory cache super line.

Additionally, in various embodiments, if no space initially exists for the cache line, an older one or more cache lines (e.g., least recently used cache line(s)) are evicted from the near memory super line to make room for the new cache line. The evicted cache line(s) are then written back to far memory. If a cache hit exists an attempt is made to write the cache line over the existing cache line in near memory. Another option is to write the new cache line directly to Far Memory, and keep the status of the new cache line in the tag array as a "miss". The same option can be used if the new cache line was previously in Near Memory, but the new data to be written to it is uncompressible (or compressible to a larger size), and there is no place for the new cache line. In this case the memory controller may decide to write the cache line to Far Memory, and mark it as invalid in Near Memory.

The write data is received from a data bus and compressed by compression logic circuitry 404. Here, the compression logic circuitry 404 may determine which of multiple compression options yields the best compression. The compression logic circuitry informs the logical super line pair circuitry 405 of the amount of compression so that the circuitry 405 can determine information that defines where the cache line will be stored in the near memory cache super line (e.g., the starting location and length of the cache line within the near memory cache super line).

Additionally, the amount of compression is used by the circuitry 405 to determine how many older compressed cache lines need to be evicted from the near memory cache super line in order to make room for the new cache line in case there is not enough space available in the physical near memory super line in the case of a cache miss, or, in case the new compressed cache line is larger than the older version of the cache line that currently resides in near memory in the case of a cache hit.

For example, if the new cache line is compressed by 50% but the least recently used cache line (in the case of a cache miss) or the older version of the cache line (in the case of a cache hit) was compressed by 75% (so that the actual data footprint in near memory is 25% of a full cache line), at least one more cache line will need to be evicted from the near memory cache line in order to make room for the new cache line. In various embodiments, the newly compressed cache line has to be fragmented and stored non-contiguously (not as a single cohesive piece) in the near memory super-line. In this case, the meta data for the cache line is expanded to indicate more than one starting location and corresponding length that extends from each starting location (so that there is one starting location and length for each different piece of the cache line that is stored in the near memory super line).

The compression logic circuitry 404 may also inform the logical super line pair management logic circuitry 405 of the type of compression being applied. The starting location, length and type of compression information meta data may be kept with meta data that identifies the cache line's system memory address and whether the cache line is valid or not (the cache line will be valid as written but as is understood in the art subsequent events can cause a cache line to be marked as invalid).

After compression, the compressed write data is provided to ECC generation logic circuitry 406 which generates ECC information for inclusion into the cache line's header information. The header information (composed of information that identifies which type of compression has been applied and the ECC information) and the compressed write data is presented to the write portion of read/write circuitry 407 and parsed into the appropriate number of 11 byte blocks for writing into memory.

Here, in the basic case where the cache line to be written is not fragmented, the logical super line management circuitry 405 converts the system memory address of the write request into lower ordered bits of a near memory address and also converts the meta data information that describes where the cache line is to be stored and the size of the cache line in the physical near memory super line into higher ordered bits of the near memory address. The write portion converts the higher ordered memory address bits into bank select information for the selected memory banks 410 in near memory and writes the compressed cache line into as one or more contiguous 11 byte blocks into the appropriate banks 410 of a particular physical cache super line within near memory.

FIG. 4d also shows an exemplary memory architecture 412 for implementing the near memory cache. It is important to emphasize that the memory architecture 412 of FIG. 4d is only exemplary and that other memory architectures may also be used. As can be seen in FIG. 4d, the physical memory 412 is organized in "words" of six 11B blocks. In the specific memory "slice" 412 of FIG. 4d, memory resources sufficient to store two such words are observable. Specifically, memory banks 410_0 through 410_5 (B0-B5) correspond to an upper ("odd") word of six 11 byte blocks and memory banks 410_6 through 410_11 (B6-B11) correspond to a lower ("even") word of six 11 byte blocks. In various embodiments, more than 6 multiple byte blocks may be used to form a word. Multiple slices like slice 412 will complete a memory structure that is capable of storing a superfine.

In an embodiment, the cache line being stored, whether compressed or not, can start at any 11B block. That is, a cache line need not start at a word boundary. As such there are two possibilities. According to a first possibility, the written cache line is entirely written into a single word of the memory resources. In this case, during a read operation, the memory word that the cache line is contained within is read from the memory. If the cache line was not aligned to the word boundary, shift circuitry that precedes the ECC and decompression circuits along the read path circuitry will additionally shift the read data to align it to an edge of the read data path. In the case of a write operation, if the cache line is not aligned to the word boundary, shift circuitry along the write data path will shift the data from the edge of the write data path to align it to the correct block in the memory word prior to writing the line into the correct blocks of the word.

According to a second possibility, the cache line is split over two adjacent words in the memory. In the case of a read operation, two words of data are read from the two memory words that the cache line is stored within. The shifting circuitry then shifts the first portion of the cache line to align to the read data path edge and shifts the second portion of the cache line to the tail of the first portion. In the case of a write, after compression and ECC, the cache line is split along the write data path for writing into two different memory words. The correct blocks of the two memory words are then written to with the corresponding portions of the cache line. Here, with the second possibility (cache split) the memory is designed to permit concurrent reading/writing from/to two memory words.

In various embodiments, the address space of each bank B0-B11 defines how many physical near memory super lines exist in near memory. For example, if each bank is implemented as a memory chip having an 11 byte data bus and a 10 bit address bus, then, 1024 different super lines can physically exist in near memory ($2^{10}=1,024$). The number of physical super lines that can exist in near memory define the ratio of logical super lines to physical super lines in the system for a particular system memory address size (e.g., which may be defined by the size of far memory). The particular memory address that the enabled bank(s) receive during a write process is determined from the conversion of the write request's system memory address to the lower ordered bits of the near memory address.

A read process includes the reception of a read request which is routed to the tag array logic circuitry. The tag array logic circuitry associates the system memory address of the read request with a particular set of logical super lines. Management circuitry associated with the pointed-to set of logical super lines determines whether a cache hit exists (that is, that there exists meta data for a stored cache line in near memory having the same system memory address as the read request).

If a cache hit results, the read request's system memory address and the meta data of the tag array that identifies the starting location and size of the requested cache line in near memory are converted into a near memory address as described just above for a write request. The requested cache line is then fetched from near memory and its ECC information is checked by ECC circuitry 409. If there is an error in the read data that cannot be corrected with the ECC protection, an error flag is raised. Otherwise, the read cache line is decompressed by decompression logic circuitry 408 and provided as the read request response.

If a cache miss results, the read request is re-directed to far memory. The cache line that is read from far memory is provided as the read request response. This cache line may also be routed to the near memory controller 402 and "filled back" into near memory cache according to the same process described above for a write request (albeit where a check is not made for a cache hit and instead the cache line is forced into near memory).

Although the preceding examples above have emphasized the use of an 11 byte block for the deconstruction/reconstruction of a cache line, those of ordinary skill will understand that this is a designer's choice and other block lengths are possible (e.g., to achieve larger or smaller header fields per block). For instance, any byte length between 10 bytes and 30 bytes per block may be sufficient. Here, it is pertinent to point out that the term "block" as associated with the smaller units that a cache line is broken down to is not be confused with the much larger "block" or "sector" of information that has traditionally been used to refer to the unit of data that is stored in mass storage such as a disk drive.

FIG. 5 shows a methodology described above. The method includes receiving a read or write request for a cache line 501. The method includes directing the request to a set of logical super lines based on the cache line's system memory address 502. The method includes associating the request with a cache line of the set of logical super lines 503. The method includes, if the request is a write request: compressing the cache line to form a compressed cache line, breaking the cache line down into smaller data units and storing the smaller data units into a memory side cache 504. The method includes, if the request is a read request: reading smaller data units of the compressed cache line from the memory side cache and decompressing the cache line 505.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the operating system and application software of the computing system. The graphics processing unit 616 typically executes graphics intensive functions to, e.g., generate graphics information that is presented on the display 603. The memory control function 617 interfaces with the system memory 602 to write/read data to/from system memory 602. The power management control unit 612 generally controls the power consumption of the system 600.

Each of the touchscreen display 603, the communication interfaces 604-707, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650.

The computing system may also include a memory system, such as system memory (also referred to as main memory) implemented with a memory controller that maintains meta data for logical super lines so that cache lines of information can be compressed prior to their being kept in a memory side cache for main memory as described at length above.

Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory controller, comprising:
   tag array circuitry to identify a set of logical super lines to which an incoming read or write request for a cache line is to be directed, each of the logical super lines in the set divided into smaller portions, each smaller portion representative of a different cache line that is cached in a memory side cache, wherein, each smaller portion is to have respective meta data stored on the memory controller that identifies a respective system memory address of the smaller portion's corresponding cache line that is cached in the memory side cache;
   management logic circuitry to determine that a cache hit exists for the incoming read or write request because a system memory address of the incoming read or write request corresponds to meta data for a particular one of the smaller portions;
   compression circuitry to compress the cache line into a compressed write cache line if the request is a write request and decompression circuitry to decompress the cache line if the request is a read request, the cache line being a compressed read cache line if the request is a read request, wherein, the compressed write cache line or compressed read cache line is stored in physical memory space of the memory side cache that is reserved for the set of logical super lines but has a size that is sufficient to store only one of the logical super lines; and, write circuitry to break down the compressed write cache line into same sized smaller units and write the same sized smaller units into the memory side cache if the request is a write request and read circuitry to read from the memory side cache same sized smaller units that the compressed read cache line is stored as within the memory side cache if the request is a read request.

2. The memory controller of claim 1 where the cache line, when uncompressed, includes 64 bytes of data and the smaller units are each composed of 11 bytes.

3. The memory controller of claim 1 where the compression circuitry is able to choose from multiple compression algorithms and apply whichever of the algorithms is able to achieve the most compression.

4. The memory controller of claim 3 further comprising ECC logic circuitry to determine ECC information for the cache line if the request is a write request, wherein, the write circuitry is to write the ECC information into a header of one of the smaller units.

5. A computing system, comprising:
a plurality of CPU processing cores;
a multi-level system memory comprising a near memory and a far memory;
a memory controller, the memory controller coupled between the plurality of CPU processing cores and the multi-level system memory, the memory controller comprising a), b), c), d) below:
  a) tag array circuitry to identify a set of logical super lines to which an incoming read or write request for a cache line is to be directed, each of the logical super lines in the set divided into smaller portions, each smaller portion representative of a different cache line that is cached in a memory side cache, wherein, each smaller portion is to have respective meta data stored on the memory controller that identifies a respective system memory address of the smaller portion's corresponding cache line that is cached in the memory side cache;
  b) management logic circuitry to determine that a cache hit exists for the incoming read or write request because a system memory address of the incoming read or write request corresponds to meta data for a particular one of the smaller portions;
  c) compression circuitry to compress the cache line into a compressed write cache line if the request is a write request and decompression circuitry to decompress the cache line if the request is a read request, the cache line being a compressed read cache line if the request is a read request, wherein, the compressed write cache line or compressed read cache line is stored in physical memory space of the memory side cache that is reserved for the set of logical super lines but has a size that is sufficient to store only one of the logical super lines; and,
  d) write circuitry to break down the compressed write cache line into same sized smaller units and write the same sized smaller units into the near memory if the request is a write request and read circuitry to read from the memory side cache same sized smaller units that the compressed read cache line is stored as within the near memory if the request is a read request.

6. The computing system of claim 5 where the cache line, when uncompressed, includes 64 bytes of data and the smaller units are each composed of 11 bytes.

7. The computing system of claim 5 where the compression circuitry is able to choose from multiple compression algorithms and apply whichever of the algorithms is able to achieve the most compression.

8. The computing system of claim 7 wherein the memory controller further comprises ECC logic circuitry to determine ECC information for the cache line if the request is a write request, wherein, the write circuitry is to write the ECC information into a header of one of the smaller units.

9. A method performed by a memory controller, comprising:
receiving a write request for a first cache line;
directing the write request to a set of logical super lines based on the first cache line's system memory address, each of the logical super lines in the set divided into smaller portions, each smaller portion representative of a different cache line that is cached in a memory side cache, wherein, each smaller portion has respective meta data stored on the memory controller that identifies a respective system memory address of the smaller portion's corresponding cache line that is cached in the memory side cache;
determining that a cache hit exists for the write request because the cache line's system memory address corresponds to meta data for a particular one of the smaller portions; and,
compressing the cache line to form a compressed write cache line, breaking the compressed write cache line down into smaller same sized data units, determining ECC information for the compressed write cache line, writing the ECC information into a header of one of the smaller same sized data units, and storing the smaller same sized data units into the memory side cache, wherein, the smaller sized data units are stored in physical memory space of the memory side cache that is reserved for the set of logical super lines but has a size that is sufficient to store only one of the logical super lines.

10. The method of claim 9 where the cache line, when uncompressed, includes 64 bytes of data and the smaller units are each composed of 11 bytes.

11. The method of claim 9 further comprising choosing from multiple compression algorithms and applying whichever of the algorithms is able to achieve the most compression.

12. The method of claim 11 where the header information identifies the compression that has been applied.

* * * * *